United States Patent

Kanbara et al.

[11] Patent Number: 6,016,231
[45] Date of Patent: Jan. 18, 2000

[54] DRIVE MECHANISM EMPLOYING ELECTROMECHANICAL TRANSDUCER AND APPARATUS EMPLOYING THE MECHANISM

[75] Inventors: Tetsuro Kanbara, Sakai; Masayuki Ueyama, Takarazuka, both of Japan

[73] Assignee: Minolta Co., Ltd., Osaka, Japan

[21] Appl. No.: 09/121,755

[22] Filed: Jul. 23, 1998

[30] Foreign Application Priority Data

Jul. 24, 1997 [JP] Japan ................................. 9-198299
Jul. 3, 1998 [JP] Japan ................................. 10-188769

[51] Int. Cl.[7] .............................................. G02B 7/02
[52] U.S. Cl. ...................................... 359/824; 359/814
[58] Field of Search .................................. 359/814, 824; 369/44.14, 44.15, 44.16

[56] References Cited

U.S. PATENT DOCUMENTS

| | | | |
|---|---|---|---|
| 5,587,846 | 12/1996 | Miyano et al. | 359/824 |
| 5,589,723 | 12/1996 | Yoshida et al. | 310/328 |
| 5,675,444 | 10/1997 | Ueyama | 359/824 |
| 5,917,267 | 6/1999 | Miyazawa et al. | 310/317 |

*Primary Examiner*—Georgia Epps
*Assistant Examiner*—Saeed Seyrafi
*Attorney, Agent, or Firm*—Sidley & Austin

[57] ABSTRACT

A device, employing a piezoelectric element, drives an object such as a lens in a camera, in which it is possible to increase a speed of a moving part to drive the object without increasing a maximum value of pulse voltage inputted to the element. The device has the element one end of which is fixed to a base seat; a rod one end of which is fixed to the other end of the element; a moving part which is frictionally mounted on the rod; and a resonant induction part which is connected to the other end of the rod. The resonant induction part has a spring part one end of which is connected to the rod, and a weight part which is connected to the other end of the spring part. The rod resonates under an effect of the resonant induction part so as to increase the amplitude of the vibrating rod when the pulse voltage applies to the element; thus increasing the speed of the moving part relative to the base seat.

17 Claims, 7 Drawing Sheets

DRIVE MECHANISM EMPLOYING ELECTROMECHANICAL TRANSDUCER AND APPARATUS EMPLOYING THE MECHANISM

FIELD OF THE INVENTION

The present invention relates to a drive mechanism employing an electromechanical transducer such as a piezoelectric element, and an apparatus, such as a camera and an electron microscope for example, in which the drive mechanism is provided in order to drive a lens frame of the camera and to drive a stage, of the electron microscope, on which an object to be observed is put.

BACKGROUND OF THE INVENTION

Figure 1:
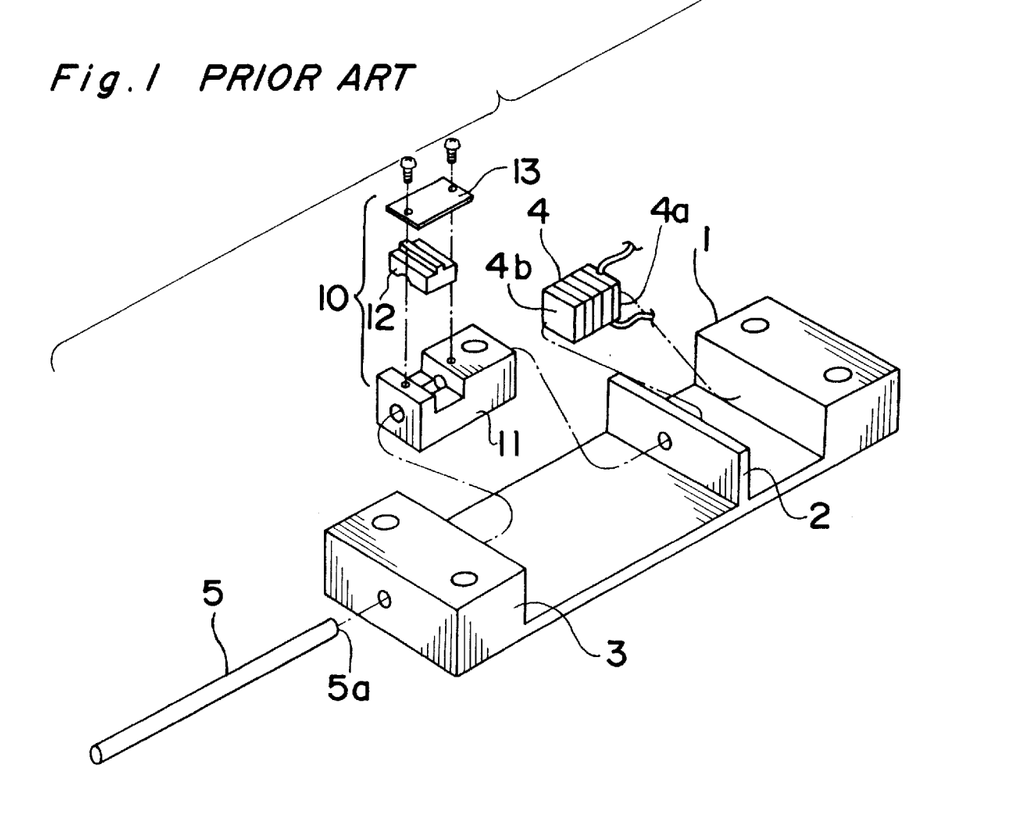
FIG. 1 is an exploded perspective view showing a conventional drive mechanism employing a piezoelectric element.
Figure 2:
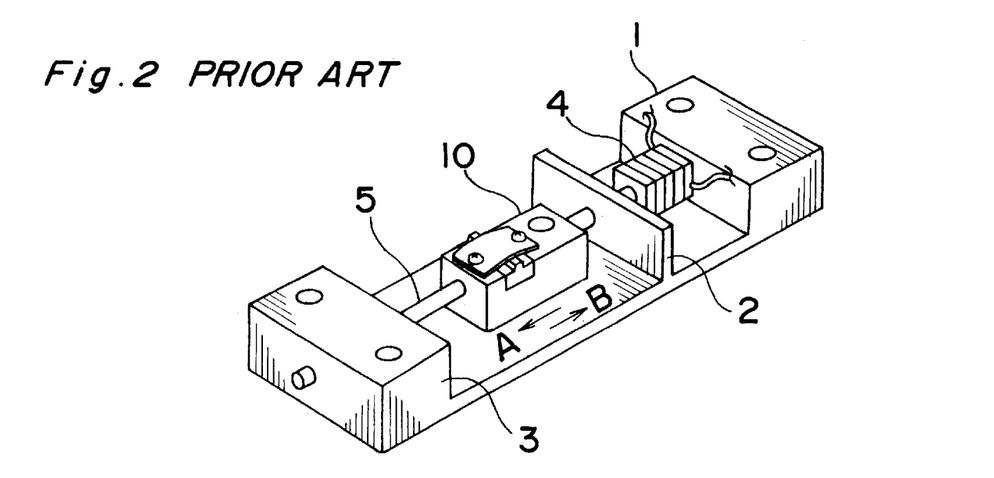
FIG. 2 is a perspective view showing that parts of the conventional drive mechanism of FIG. 1 have been assembled together.

As a drive mechanism employing an electromechanical transducer such as a piezoelectric element which varies in length (i.e. expands and contracts) with application of voltage, there has been conventionally provided a drive mechanism as shown, for example, in an exploded perspective view of FIG. 1, and in an assembly perspective view of FIG. 2.

This drive mechanism, in which a moving part 10 can be moved relative to a base seat (anchor block) 1 as will be described later, can be used as, for example, a lens drive mechanism in a camera. That is, in case that the moving part 10 is connected to a lens frame (unshown), a lens provided in the lens frame can be moved along with the movement of the moving part 10.

A piezoelectric element 4 is constituted by stacking or laminating a large number of piezoelectric plates. One end 4a of the piezoelectric element 4 in its expanding/contracting direction is fixed to the base seat 1, while the other end 4b thereof is fixed to one end 5a of a driving rod 5. The rod 5 is slidably supported by support portions 2 and 3 formed integrally with the base seat 1.

In the moving part 10, the rod 5 is held or sandwiched between a body 11 and a cap 12, and a biasing force in its holding direction of the rod 5 is exerted upon the body 11 and the cap 12 by a pressure spring 13. Thus, the body 11 and the cap 12, of the moving part 10, frictionally hold the rod 5.

An unshown voltage control circuit (drive pulse generating device) is connected to the piezoelectric element 4. When a fluctuating voltage in a sawtoothed wave form as shown in FIG. 3 is continuously applied to the piezoelectric element 4 from the voltage control circuit, the piezoelectric element 4 expands and contracts, causing the rod 5 to oscillate or vibrate in its lengthwise direction.

Figure 3:
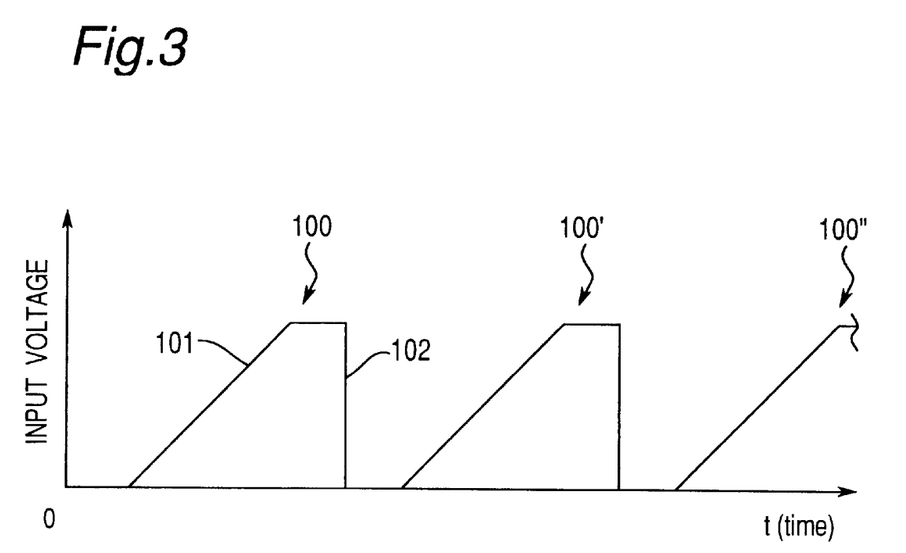
FIG. 3 is a graph showing a voltage in a pulse wave form that is applied to the drive mechanism of FIG. 1.

More specifically, when the piezoelectric element 4 expands relatively slowly in accordance with a gently rising slope portion 101 of a first wave 100 of the input voltage as shown in FIG. 3, the rod 5 moves slowly in a direction of arrow A relative to the base seat 1 as shown in FIG. 2. Then, when the voltage is abruptly dropped down as shown by an abruptly (or steeply) falling slope portion 102 of the first wave 100 in the same figure, the piezoelectric element 4 abruptly contracts to return back to the initial length. As a result, the rod 5 abruptly moves in a direction of arrow B relative to the base seat 1.

When the following waves 100', 100" . . . , similar to the first wave 100, of the input voltage, as shown in FIG. 3, are continuously applied to the piezoelectric element 4, the rod 5 repeatedly oscillates or vibrates so that the rod 5 moves slowly in the direction A and moves abruptly in the direction B.

The spring force of the pressure spring 13 of the moving part 10, or the frictional force exerted between the rod 5 and the moving part 10, is adjusted so that the moving part 10 moves together with the rod 5 relative to the base seat 1 when the rod 5 moves slowly, and so that the moving part 10 remains stationary relative to the base seat 1 when the rod 5 rapidly or abruptly moves relative thereto. Accordingly, while the rod 5 is being oscillated, the moving part 10 moves in the direction A relative to the base seat 1.

Meanwhile, the moving part 10 can be moved in a direction B in FIG. 2, by changing the pulse wave form of the input voltage applied to the piezoelectric element 4 into a wave form having an abruptly (or steeply) rising slope portion and a gently falling slope portion, instead of the wave form shown in FIG. 3. The principle that the moving part 10 is moved or actuated in this case, is similar to the principle of the foregoing.

With the constitution of the drive mechanism using the piezoelectric element 4 shown in FIGS. 1 and 2, the amplitude and frequency of the vibrating rod 5 are decided by the maximum value and frequency of the applied pulse voltage, provided that the same piezoelectric element is used.

Also, with the constitution thereof, the greater the amplitude and the higher the frequency of the rod 5 are, the greater the relative moving speed between the rod 5 and the moving part 10 is.

Therefore, in order to attain a higher speed of actuator by increasing the moving speed of the moving part 10 with the same frequency of the applied pulse voltage, it is inevitably necessary to increase the maximum value of the pulse voltage applied to the piezoelectric element 4.

SUMMARY OF THE INVENTION

Accordingly, it is an object of the present invention to provide a drive mechanism employing an electromechanical transducer in which the moving speed of the moving part is greater without increasing the maximum value of the pulse voltage which is applied to the electromechanical transducer.

It is another object of the present invention to provide an apparatus in which the drive mechanism is provided.

In accomplishing these and other objects of the present invention, according to one aspect of the present invention, there is provided a drive mechanism that comprises: an electromechanical transducer that expands and contracts in response to an electric pulse being supplied thereto; a drive member one of ends of which is connected to the electromechanical transducer; a moving member that is frictionally connected to the drive member; and a resonant induction part that is connected to the other of ends of the drive member.

In the mechanism, for example, the electromechanical transducer may be a piezoelectric element, and/or the drive member may be a driving rod, and/or the moving member may be frictionally mounted around the driving rod so that the moving member may be driven to move in a direction of an axis of the driving rod when the electromechanical transducer is supplied with the electric pulse.

In the mechanism, for example, an end, opposite the drive member, of the electromechanical transducer may be fixed to a stationary base, and/or an object, such as a lens frame holing a lens in a camera and a stage of an electron microscope on which a specimen to be observed is put for example, to be driven or actuated, may be connected to the moving member.

With the mechanism, when the electric pulse is supplied to the electromechanical transducer, the electromechanical transducer expands and contracts, namely vibrates or oscillates, the drive member and the resonant induction part vibrates or oscillates, thus moving the moving member with respect to the drive member.

According to the mechanism, the drive member resonates due to an effect of the resonant induction part, when the drive member is vibrated by the expansion and contraction of the electromechanical transducer. Therefore, in contrast with the conventional drive mechanism in which there is not provided such a resonant induction part, both the amplitude and the moving speed of the drive member increase, when the same pulse voltage having the same wave form applied to the conventional drive mechanism is supplied to the electromechanical transducer of the drive mechanism according to the one aspect of the present invention. Namely, the relative moving speed of the moving member to the drive member increases. Consequently, by making use of the drive mechanism, it is possible to realize a high speed drive or actuation of the object to be driven, without increasing the amount of the pulse voltage which is supplied to the electromechanical transducer. In other words, it is possible to save an electric power to drive the electromechanical transducer.

In the mechanism, it is preferable that the resonant induction part is a part for controlling a characteristics of the resonance of the drive member.

With the mechanism, for example, the resonant induction part allows the drive member, connected to the electromechanical transducer, to have a first natural frequency and a second natural frequency which is different from the first natural frequency. In this case, by incorporating a pair of sine waves having the first and second natural frequencies in a number of frequency components constituting the pulse voltage, the actual vibrating or oscillating wave form of the moving part become a sawtoothed wave form with different slope portions (i.e. for example, a gently rising slope portion and an abruptly (or steeply) falling slope portion per cycle of wave, or vice versa), in which the sawtoothed wave form is formed by combining the pair of sine waves to each other. That is, it is possible to effectively give such different slope portions to the vibrating wave form, with the moving part having the two different natural frequencies.

By the way, the different slope portions of wave form as described above, more specifically, are the portions that have different slopes at part of going up and at part of falling down, respectively, of the wave.

The resonant induction part can comprise an elastic member and a weight.

In the mechanism, it is preferable that the elastic member is on a side of the other of ends of the drive member, and the weight is on a side of a free end.

In the mechanism, the elastic member can be a spring.

Alternatively, the resonant induction part can comprise a coiled spring with a first part in which the coiled spring is wound round closely and a second part in which the coiled spring is wound round less closely, where it is preferable that the second part of the coiled spring is on a side of the other of ends of the drive member, and the first part thereof is on a side of a free end. According to the mechanism, it is possible to reduce the number of parts and steps for assembling the drive mechanism; therefore, the cost of production can be lowered.

Alternatively, the resonant induction part can comprise a leaf spring with a first part in which the leaf spring is flat and a second part in which the leaf spring is bent, where it is preferable that the second part of the leaf spring is on a side of the other of ends of the drive member, and the first part thereof is on a side of a free end.

According to the mechanism, it is also possible to reduce the number of parts and steps for assembling the drive mechanism; therefore, the cost of production can be lowered.

According to another aspect of the present invention, there is provided an apparatus that comprises: an electromechanical transducer that expands and contracts in response to an electric pulse being supplied thereto; an electric circuit that supplies the electric pulse to the electromechanical transducer; a drive member one of ends of which is connected to the electromechanical transducer; a moving member that is frictionally connected to the drive member; and a driven member that is connected to the moving member so that the driven member is driven by the moving member; a resonant induction part that is connected to the other of ends of the drive member.

The apparatus, for example, may be a camera, an electron microscope, and so on.

In the apparatus, the driven member can comprise any object, such as the lens frame in the camera and a stage of an electron microscope for example, to be driven, actuated or moved.

In the apparatus, the resonant induction part can comprise an elastic member and a weight.

In the mechanism, it is preferable that the elastic member is on a side of the other of ends of the drive member, and the weight is on a side of a free end.

In the apparatus, the elastic member can be a spring.

Alternatively, the resonant induction part can comprise a coiled spring with a first part in which the coiled spring is wound round closely and a second part in which the coiled spring is wound round less closely, where it is preferable that the second part of the coiled spring is on a side of the other of ends of the drive member, and the first part thereof is on a side of a free end.

According to the mechanism, it is possible to reduce the number of parts and steps for assembling the apparatus; therefore, the cost of production can be lowered.

Alternatively, the resonant induction part can comprise a leaf spring with a first part in which the leaf spring is flat and a second part in which the leaf spring is bent, where it is preferable that the second part of the leaf spring is on a side of the other of ends of the drive member, and the first part thereof is on a side of a free end.

According to the mechanism, it is also possible to reduce the number of parts and steps for assembling the apparatus; therefore, the cost of production can be lowered.

BRIEF DESCRIPTION OF THE DRAWINGS

These and other objects and features of the present invention will become clear from the following description taken in conjunction with the preferred embodiment and modifications thereof with reference to the accompanying drawings, in which.

DETAILED DESCRIPTION OF THE PREFERRED EMBODIMENT

Before a description of the preferred embodiment and its modifications of the present invention proceeds, it is to be noted that like or corresponding parts are designated by like reference numerals throughout the accompanying drawings.

Referring to FIGS. 3 through 12, the description is made below on a camera with a drive mechanism, employing a piezoelectric element as an electromechanical transducer, according to a preferred embodiment and its modifications of the present invention.

First, referring to FIGS. 3 through 8, the description is made below on the camera with the drive mechanism according to the preferred embodiment.

Figure 4:
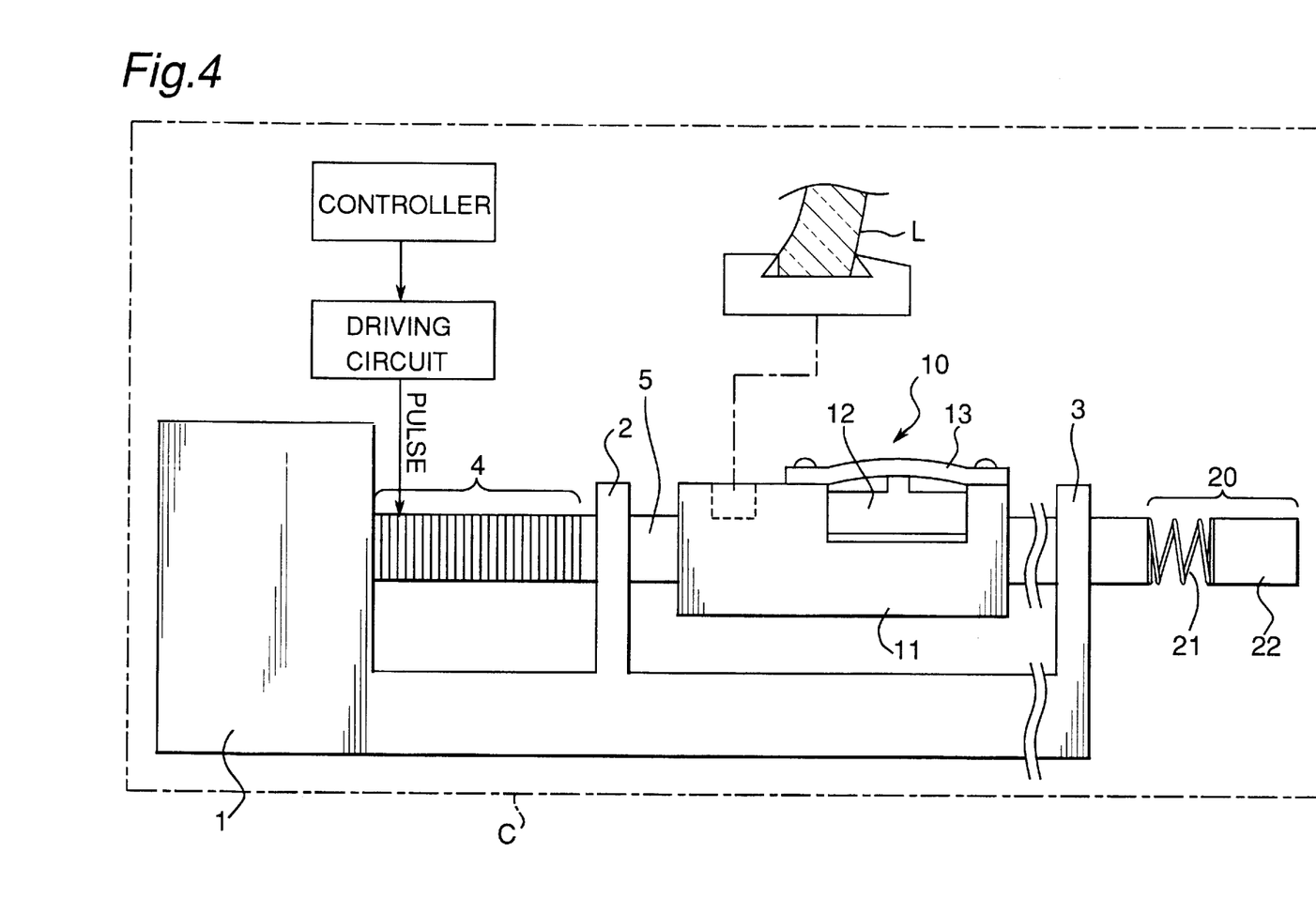
FIG. 4 is a front view showing a camera with a drive mechanism according to a preferred embodiment of the present invention.

FIG. 4 is a front view illustrating the camera of the preferred embodiment. The drive mechanism shown therein differs from the conventional drive mechanism of FIGS. 1 and 2 only in that the drive mechanism of FIG. 4 has a resonant induction part 20, and the rest of the construction of the drive mechanism of FIG. 4 is similar to that of the drive mechanism of the conventional drive mechanism of FIGS. 1 and 2. Therefore, like or corresponding components are designated by like reference numerals between the conventional drive mechanism, and the drive mechanism of the preferred embodiment, and the explanation thereof is omitted below.

As shown in FIG. 4, the drive mechanism is constructed as a driving unit, for driving a lens L, which is incorporated inside the camera as shown by an imaginary line C in the figure. The drive mechanism and the lens L are connected to each other via a connecting mechanism shown by an imaginary line in the figure.

The camera C has a controller, with a CPU, for controlling an overall operation of the camera, and has a driving circuit the operation of which is also controlled by the controller. The driving circuit outputs a driving pulse to the piezoelectric element 4 under the control of the controller so that the piezoelectric element 4 properly expands and contracts.

As already described, the moving part 10 is moved relatively both to the rod 5 and to the base seat 1 when the rod 5 vibrates or oscillates. Given the same frequency for vibrating the rod 5, the larger the amplitude (displacement) of the rod 5 is, the greater the relative moving speed of the moving part 10 to the rod 5 becomes. In the preferred embodiment, the drive mechanism has the resonant induction part 20 which is connected to one end of the rod 5 as shown in FIG. 4, with the construction of which the rod 5 is resonated at the frequency so that the amplitude in vibration of the rod 5 becomes greater without increasing the pulse voltage applied to the piezoelectric element 4.

More specifically, the resonant induction part 20 is constructed as follows. That is, in the drive mechanism of FIG. 4, a weight 22 is fixed, via a spring 21, to the one end, of the rod 5, which is on a side opposite to the piezoelectric element 4, where both the weight 22 and the spring 21 constitute the resonant induction part 20 of the drive mechanism.

Next, referring to a graph of FIG. 5, it is explained below on a function and effect of the resonant induction part 20 of the drive mechanism.

A dotted line in the figure shows a relation between a frequency of a sine wave applied to the piezoelectric element 4, and a maximum amplitude of the rod 5, in case that the resonant induction part 20 is removed from the drive mechanism of FIG. 4, and in case that a simple sine wave of voltage is supplied to the piezoelectric element 4 while changing the frequency of the voltage. The dotted line indicates that the rod 5, which is connected to the piezoelectric element 4, has a particular inherent frequency (i.e. natural frequency) f2.

Meanwhile, a solid line in the figure also shows a relation between a frequency of a sine wave applied to the piezoelectric element 4, and a maximum amplitude of the rod 5 of the drive mechanism of FIG. 4 in case that a simple sine wave of voltage is supplied to the piezoelectric element 4 while changing the frequency of the voltage. The solid line indicates that the rod 5, which is connected to the resonant induction part 20, has a pair of different natural frequencies f1 and f3 with maximum amplitudes "a1" and "a2", respectively, as shown in FIG. 5. That is, the mounting of the resonant induction part 20 on the one end of the rod 5 opposite to the piezoelectric element 4 allows the rod 5 to have the two different natural frequencies f1 and f3.

Generally, the sawtoothed wave form 100, 100', 100", as shown in FIG. 3 is formed by combining a number of simple sine waves. Therefore, by including sine waves with frequencies which are equal to the two different natural frequencies f1 and f3 of the rod 5, in a number of sine waves which are combined together to form the sawtoothed wave form as shown in FIG. 3, the rod 5 is vibrated under the components of the corresponding sine waves. Although the rod 5 is, of course, influenced by other components of frequencies included in the number of sine waves, the influence thereby can be neglected because of its smallness, in contrast with the two different natural frequencies f1 and f3. Therefore, when the sawtoothed wave 100, 100' 100" . . . as shown in FIG. 3 is supplied to the piezoelectric element 4, the actual vibrating wave form of the rod 5 is approximate to a wave form, with an effective shape of wave including a gently rising slope portion and an abruptly (or steeply)

falling slope portion, which is formed by combining the frequency f1 and the frequency f2 as shown in FIGS. 6(a), 6(b), and 6(c).

By the way, in each of the graphs shown by FIG. 6(a), FIG. 6(b) and FIG. 6(c), the horizontal axis (lateral axis) indicates "time," and the vertical axis indicates "amplitude of the rod 5." More specifically, FIG. 6(a) indicates a vibrating wave form of the rod 5 that is gained as the voltage of sine wave with the frequency f1 is supplied to the piezoelectric element 4; FIG. 6(b) indicates a vibrating wave form of the rod 5 that is gained as the voltage of sine wave with the frequency f3 is supplied to the piezoelectric element 4; and FIG. 6(c) indicates a vibrating wave form of the rod 5 that is gained by combining the vibrating wave form of FIG. 6(a) and the vibrating wave form of FIG. 6(b) with each other.

Figure 5:
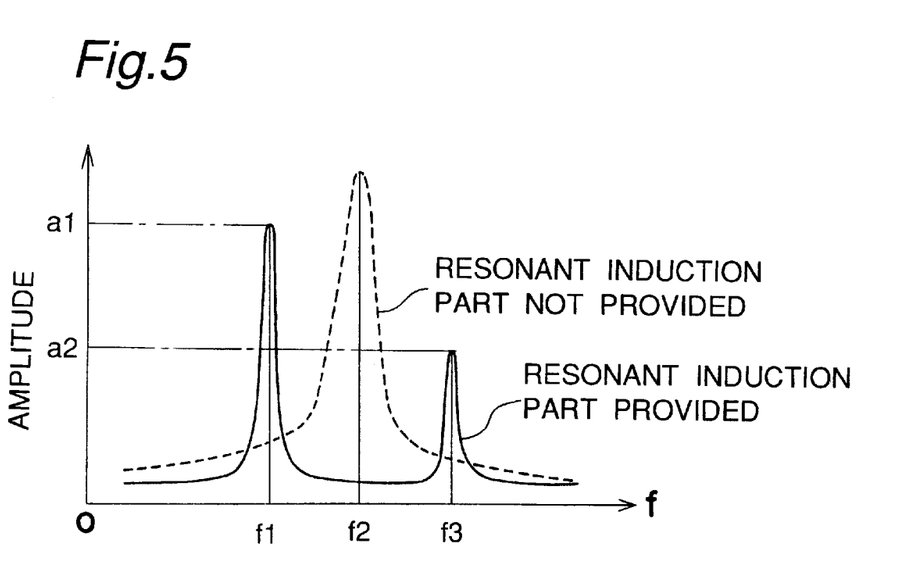
FIG. 5 is a graph showing a function and effect of a resonant induction part of the drive mechanism of FIG. 4.

In contrast with the drive mechanism of the preferred embodiment, in the conventional drive mechanism, as shown in FIGS. 1 and 2, having no resonant induction part, the rod 5 has only one natural frequency f2 as shown in FIG. 5. Accordingly, in case that the piezoelectric element 4 is actuated or driven by a sawtoothed wave including the sine wave with the frequency of f2, the rod 5 is resonated to vibrate only under the great influence of the frequency components f2. That is, in this case, the amplitudes of the rod 5, which is vibrated by other frequency components, can to be neglected due to its smallness, in contrast with the amplitude of the rod 5 caused by the frequency of f2; therefore, the resulting vibrating wave form of the rod 5 is approximate to the sine wave form. In other words, it is not possible to give the wave form different slopes on its rising slope portion and on its falling (or dropping) slope portion. As a result, the moving part of the driving mechanism can not be actuated or not driven properly, or the driving efficiency (or actuating efficiency) is reduced or lowered.

Therefore, in the conventional drive mechanism, in order to drive or actuate the moving part 10 thereof, it is necessary to exclude the frequency component corresponding to f2 from a number of frequency components which are combined to each other to form the sawtoothed wave form. More specifically, for example, the piezoelectric element 4 is driven at a frequency which is less than the natural frequency f2 of the rod 5. Namely, the moving part 10 in the conventional drive mechanism is driven or actuated with a state in which the rod 5 is not resonated, where it is not possible to effectively give the vibrating wave form of the rod 5 its gently rising slope portion and its abruptly (or steeply) falling slope portion.

By the way, the wave form of the input voltage which is supplied to the piezoelectric element 4 is not limited to the sawtoothed wave form as mentioned above. The wave form thereof may be a rectangular one. Such a rectangular wave form also can be gained from a combination of a number of simple sine wave forms, as well as the sawtoothed wave form. Hence, by including the sine waves with frequencies f1 and f3 as the frequency components therein, its resultant wave form as shown in FIG. 6(c) is gained.

More specifically, a plural number of frequency components to be combined together, include a basic wave (or fundamental wave, or primary wave) the frequency of which is equal to the frequency of the distortion wave (or strain wave), such as the sawtoothed wave and rectangular wave, which is gained by combining the plural number of frequency components, and include a plural number of higher harmonic waves the frequencies of which are integral multiples of the basic wave. The frequency of the basic wave is modulated or adjusted to the frequency which is equal to or less than the frequency f1 as shown in FIGS. 5 and 6(a). This is because it is not possible to use the resonance of the rod 5 due to the frequency f1 in case that the frequency of the basic wave is greater than the frequency f1, so that it is difficult to effectively provide the gently rising slope portion and the abruptly falling slope portion, as mentioned above, to the vibrating wave form of the rod 5.

The resonant induction part 20 has a function not only to give the rod 5 the two natural frequencies f1 and f3 as explained above, but also to increase the displacement (amplitude) of the rod 5, relative to a constant voltage applied to the piezoelectric element 5. Next, the function is explained below, referring to FIG. 7.

Figures 7, 8:
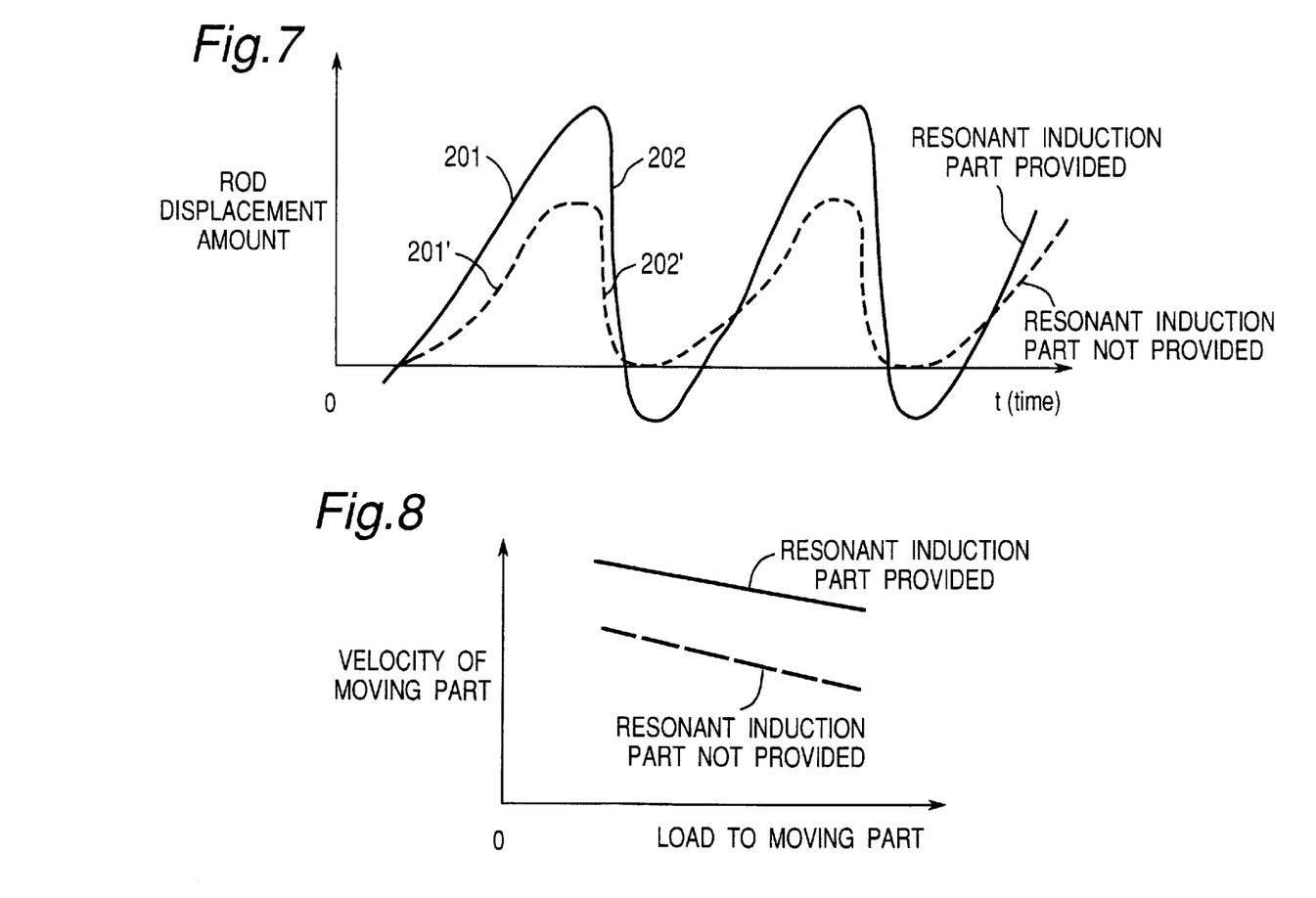
FIG. 7 is a graph showing a displacement amount, of the rod of the drive mechanism of FIG. 4, resulting when the pulse voltage of FIG. 3 is applied, where a solid line indicates a case in which the resonant induction part is provided and where a broken line indicates a case in which the resonant induction part is not provided.
FIG. 8 is a graph showing a relationship between a load acting on the moving part and a moving speed of the moving part.

In FIG. 7, a solid line schematically illustrates a displacement of the rod 5 when the changing voltage similar to the one shown in FIG. 3 is applied to the piezoelectric element 4 in case that there is provided the resonant induction part 20 on the drive mechanism, and a dotted line schematically illustrates a displacement of the rod 5 when the changing voltage similar thereto is applied to the piezoelectric element 4 in case that there is not provided the resonant induction part 20 on the drive mechanism. Gently rising slope portions 201 and 201', respectively, of the vibrating rod 5 shown in the figure, correspond to the gently rising slope portion 101 of the wave 100, 100', 100" . . . shown in FIG. 3, where the rod 5 slowly or gently moves or displaces on the corresponding slope portions in both cases. On the other hand, abruptly (or steeply) falling slope portions 202 and 202', respectively, of the vibrating rod 5, correspond to the abruptly (or steeply), falling slope portion 102 of the wave 100, 100', 100" . . . shown in FIG. 3, where the rod 5 abruptly or rapidly moves or displaces on the corresponding falling slope portions in both cases. The amplitude of the rod 5 is very small; therefore, the moving amount of the moving part 10 relative either to the rod 5 or to the base seat 1, per pulse of the voltage applied to the piezoelectric element 4, is very small. With the small or minute movement of the moving part 10 relative thereto, it is possible to accurately control a position of the lens.

The oscillation frequency (or vibration frequency) of the rod 5 scarcely changes no matter whether the resonant induction part 20 is provided or not on the drive mechanism. However, the graphs shown in FIG. 7 shows that the amplitude (displacement) of the rod 5 having the resonant induction part 20 becomes greater than the amplitude of the rod 5 having no resonant induction part. That is, the amplitude and moving speed of the rod 5 become greater in case that the resonant induction part 20 is provided, than in case that the resonant induction part 20 is not provided. Accordingly, the moving speed of the moving part 10 relative to the rod 5 (therefore, relative to the base seat 1) becomes greater.

Figure 6:
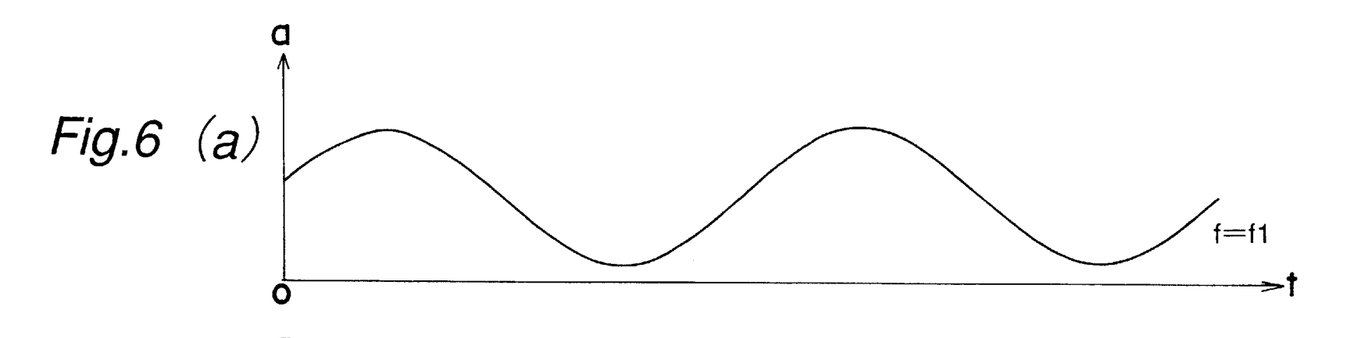
FIGS. 6(a), 6(b), and 6(c) are graphs showing vibration wave forms of a rod of the drive mechanism of FIG. 4.

If the spring constant of the spring 21, the mass of the weight 22, the frequencies f1 and f3 as shown in FIG. 6(a) and FIG. 6(b), are all properly set so that the resulting wave form as shown in FIG. 6 (c) becomes a desired wave form, the same wave form of the rod 5 gained in case that the resonant induction part 20 is not provided, can be obtained with a lower voltage, which in turn realizes a power saving.

Also, FIG. 8 shows a relation between a load acting on the moving part 10 (for example, a force acting on the moving part 10 as a reaction to its lens driving force) and a moving speed of the moving part 10. In the figure, a solid line indicates a case in which the resonant induction part 20 is provided, and a dotted line indicates a case in which the resonant induction part is not provided. The speed of the moving part 10 relative to the base seat 1 decreases as the load exerting upon the moving part 10 increases, no matter whether the resonant induction part is provided or not on the drive mechanism. However, the graph shown in the figure indicates that given the same load on the moving part 10, the moving speed is greater in case that the resonant induction part 20 is provided.

Next, referring to FIGS. 9 through 12, it is explained on drive mechanisms, with resonant induction parts, according to four modifications of the embodiment.

Figure 9:
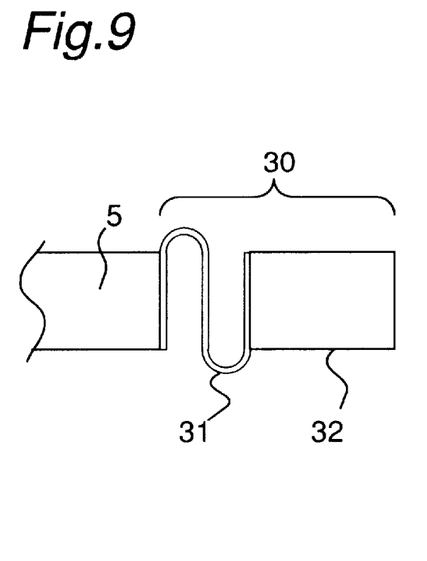
FIG. 9 is an explanatory view showing a resonant induction part of a driving unit according to a first modification of the embodiment.

FIG. 9 shows a resonant induction part 30, which is provided on a drive mechanism, according to a first modification of the embodiment.

In the drive mechanism, the resonant induction part 30 has a curved leaf spring 31 one end of which is connected to an end of the rod 5, and has a weight 32 to which the other end of the leaf spring 31 is connected.

Figure 10:
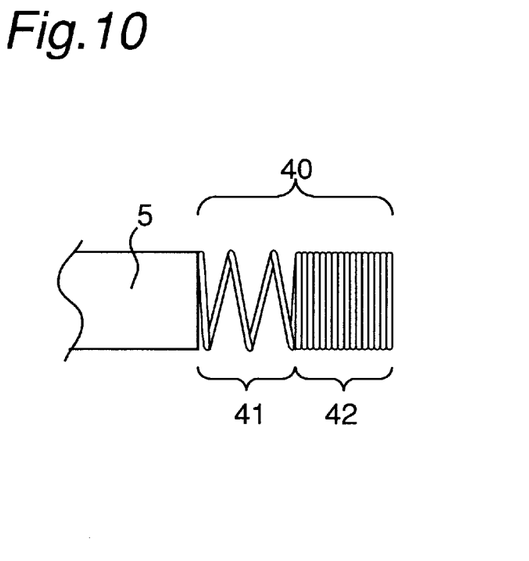
FIG. 10 is an explanatory view showing a resonant induction part of a driving unit according to a second modification of the embodiment.

FIG. 10 shows a resonant induction part 40, which is provided on a drive mechanism, according to a second modification of the embodiment.

In the drive mechanism, the resonant induction part 40 is constituted by a single coil spring which has a closely coiling part 42 and a sparsely (i.e. less closely) coiling part 41 where one end of the latter coiling part 41 is connected to an end of the rod 5. In the construction, the closely coiling part 42 of the coil spring functions as a weight.

Figure 11:
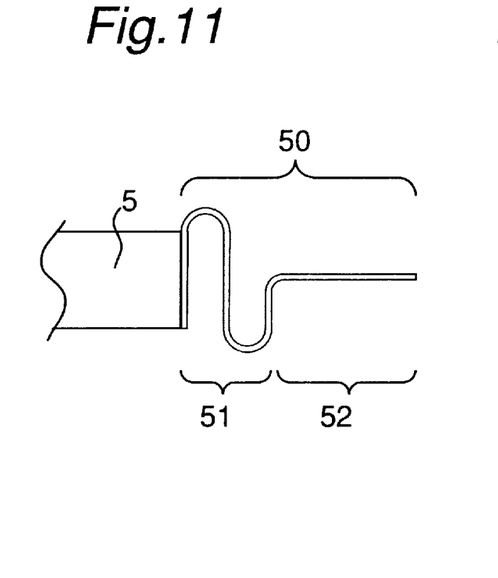
FIG. 11 is an explanatory view showing a resonant induction part of a driving unit according to a third modification of the embodiment.

FIG. 11 shows a resonant induction part 50, which is provided on a drive mechanism, according to a third modification of the embodiment.

In the drive mechanism, the resonant induction part 50 is constituted by a single leaf spring which has a curved part 51 and a flat part 52 where one end of the former curved part 51 is connected to an end of the rod 5. In the construction, the flat part 52 of the leaf spring functions as a weight.

Figure 12:
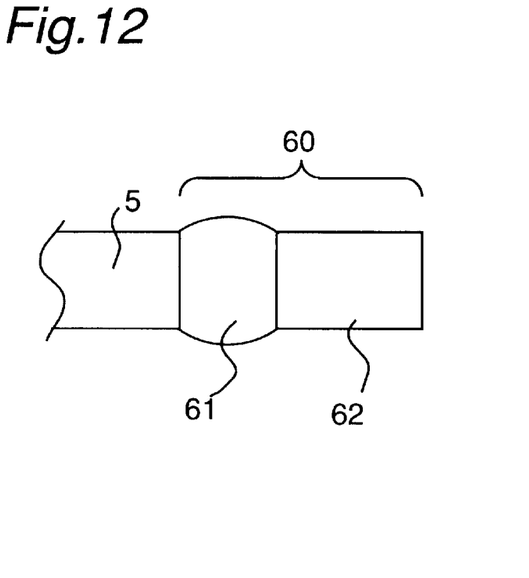
FIG. 12 is an explanatory view showing a resonant induction part of a driving unit according to a fourth modification of the embodiment.

FIG. 12 shows a resonant induction part 60, which is provided on a drive mechanism, according to a fourth modification of the embodiment.

In the drive mechanism, the resonant induction part 60 has a resin part 61 one end of which is connected to an end of the rod 5, and has a weight 62 to which the other end of the resin part 61 is connected. In the construction, the resin part 61 functions as a spring part due to its elasticity.

In the preferred embodiment, and in each of the modifications described above, the characteristics of resonance of the rod 5 is controlled so that the rod 5 has two natural frequencies, with the resonant induction part being provided on the drive mechanism. And the moving part of the drive mechanism is driven or actuated by the gently rising slope portion and the abruptly falling slope portion of the wave form, of the vibrating rod 5, that are formed by combining frequency components corresponding to the resonant frequency components thereof.

In order to effectively drive or actuate the rod 5, a preferable combination of frequency components is selected so as to gain an effective sawtoothed vibrating wave form that is formed by combining to each other various components of vibrating wave forms, of the rod 5, originating from frequency components.

It is possible to select such a preferable combination of frequency components by properly adjusting a spring constant of the spring part 21, 31, 41, 51, 61 of the resonant induction part, and/or properly adjusting the weight of the weight part 22, 32, 42, 52, 62 thereof, and/or the weight of the rod 5. That is, it is possible to change the vibrating wave form, of the rod 5, as shown in FIG. 6(*c*) into a desire vibrating wave form, by changing the actual frequencies f1 and f2, respectively.

Although the present invention has been fully described in connection with the preferred embodiment and modifications thereof with reference to the accompanying drawings, it is to be noted that that various changes and other modifications are apparent to those skilled in the art. Such changes and modifications are to be understood as included within the scope of the present invention as defined by the appended claims unless they depart therefrom.

What is claimed is:

1. A drive mechanism comprising:
   an electromechanical transducer that expands and contracts in response to an electric pulse being supplied thereto;
   a drive member having a first end and a second end, the first end being connected to the electromechanical transducer;
   a moving member that is frictionally connected to the drive member; and
   a resonant induction part that is connected to the second end of the drive member.

2. A drive mechanism as claimed in claim 1, wherein the resonant induction part comprises an elastic member and a weight.

3. A drive mechanism as claimed in claim 2, wherein the elastic member is connected to the second end of the drive member, and the weight is connected to a free end of the elastic member.

4. A drive mechanism as claimed in claim 2, wherein the elastic member is a spring.

5. A drive mechanism as claimed in claim 1, wherein the resonant induction part comprises a coiled spring with a first part in which the coiled spring is closely wound and a second part in which the coiled spring is less closely wound round than the first part.

6. A drive mechanism as claimed in claim 5, wherein the second part of the coiled spring is connected to the second end of the drive member, and the first part thereof is on a free end.

7. A drive mechanism as claimed in claim 1, wherein the resonant induction part comprises a leaf spring with a first part in which the leaf spring is flat and a second part in which the leaf spring is bent.

8. A drive mechanism as claimed in claim 7, wherein the second part of the leaf spring is connected to the second end of the drive member, and the first part thereof is on a side of a free end.

9. An apparatus comprising:
   an electromechanical transducer that expands and contracts in response to an electric pulse being supplied thereto;
   an electric circuit that supplies the electric pulse to the electromechanical transducer;
   a drive member having a first end and a second end, the first end being connected to the electromechanical transducer;
   a moving member that is frictionally connected to the drive member; and
   a driven member that is connected to the moving member so that the driven member is driven by the moving member;
   a resonant induction part that is connected to second end of the drive member.

10. An apparatus as claimed in claim 9, wherein the resonant induction part comprises an elastic part and a weight.

11. An apparatus as claimed in claim 10, wherein the elastic part is connected to the second end of the drive member, and the weight is connected to a free end of the elastic part.

12. An apparatus as claimed in claim 9, wherein the elastic part is a spring.

13. The apparatus as claimed in claim 9, wherein the resonant induction part comprises a coiled spring with a first part in which the coiled spring is closely wound and a second part in which the coiled spring is less closely wound than the first part.

14. An apparatus as claimed in claim 13, wherein the second part of the coiled spring is connected to the second end of the drive member, and the first part thereof is on a free end.

15. An apparatus as claimed in claim 9, wherein the resonant induction part comprises a leaf spring with a first part in which the leaf spring is flat and a second part in which the leaf spring is bent.

16. An apparatus as claimed in claim 15, wherein the second part of the leaf spring is connected to the second end of the drive member, and the first part thereof is on a free end.

17. An apparatus as claimed in claim 9, wherein the driven member is a lens.

* * * * *

UNITED STATES PATENT AND TRADEMARK OFFICE
CERTIFICATE OF CORRECTION

PATENT NO : 6,016,231
DATED : January 18, 2000
INVENTOR(S): Tetsuro KANBARA and Masayuki UEYAMA It is certified that error appears in the above-identified patent and that said Letters Patent is hereby corrected as shown below:

Column 10, line 38 (claim 5, line 5), delete "round".

Column 10, line 49 (claim 8, line 3), delete "a side of".

Column 10, line 66 (claim 9, line 15), before "second", insert --the--.

Column 11, line 11 (claim 13, line 1), delete "The", and insert --An--.

Signed and Sealed this

Eighth Day of May, 2001

Attest:

NICHOLAS P. GODICI

Attesting Officer

Acting Director of the United States Patent and Trademark Office